United States Patent [19]

Pickel

[11] Patent Number: 4,722,315
[45] Date of Patent: Feb. 2, 1988

[54] METHOD FOR IMPROVED INTERNAL EXHAUST GAS RECIRCULATION IN AN INTERNAL COMBUSTION ENGINE

[75] Inventor: Hans Pickel, Nuremberg, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 786,842

[22] Filed: Oct. 11, 1985

[30] Foreign Application Priority Data

Oct. 11, 1984 [DE] Fed. Rep. of Germany ....... 3437330

[51] Int. Cl.$^4$ .......................................... F02M 25/06
[52] U.S. Cl. ................................. 123/568; 123/90.11; 123/90.15; 123/571
[58] Field of Search .................. 123/90.11, 90.16, 90.6, 123/568, 569, 571, 90.15, 90.17

[56] References Cited

U.S. PATENT DOCUMENTS

| | | | |
|---|---|---|---|
| 2,647,500 | 8/1953 | Lang | 123/90.6 |
| 3,403,667 | 10/1968 | Santi | 123/90.6 X |
| 4,327,676 | 5/1982 | McIntire et al. | 123/90.6 |
| 4,357,917 | 11/1982 | Aoyama | 123/90.16 |
| 4,620,510 | 11/1986 | Fueling | 123/90.6 |

FOREIGN PATENT DOCUMENTS 2134596 8/1984 United Kingdom ............. 123/90.11

Primary Examiner—Willis R. Wolfe, Jr.
Attorney, Agent, or Firm—Becker & Becker Inc.

[57] ABSTRACT

An air-compressing, self-ignition or spark-ignition, four-stroke internal combustion engine having direct fuel injection, turbo-charging, and load-dependent exhaust gas recirculation which is effected, at least in certain operating ranges, by intervention in the gas change system. In order to prevent weakening of the air swirl energy (charge swirl energy) by exhaust gas recirculation at low load in such an internal combustion engine, on the one hand, and, on the other hand, to obtain assisted cylinder scavenging at higher loads, the intake valve is briefly opened during the exhaust stroke. The opening of the intake valve occurs no earlier than 30 degress crank angle after gas-change bottom dead center, and the highest lift is between 15 and 30% of the maximun intake valve lift; and, at the latest, when the exhaust valve closes (shortly before gas change top dead center). Only a minimum opening of the intake valve exists and this is maintained until the start of the intake stroke (shortly after gas change top dead center).

5 Claims, 4 Drawing Figures

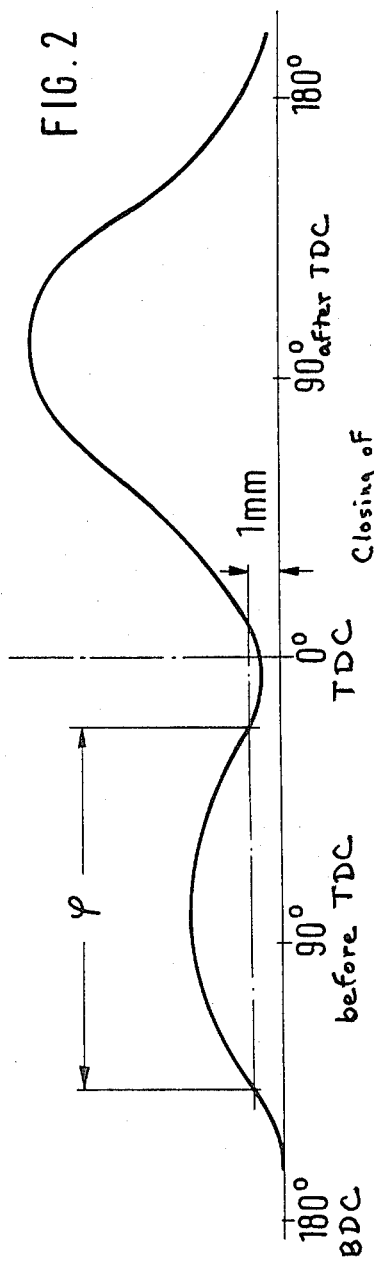
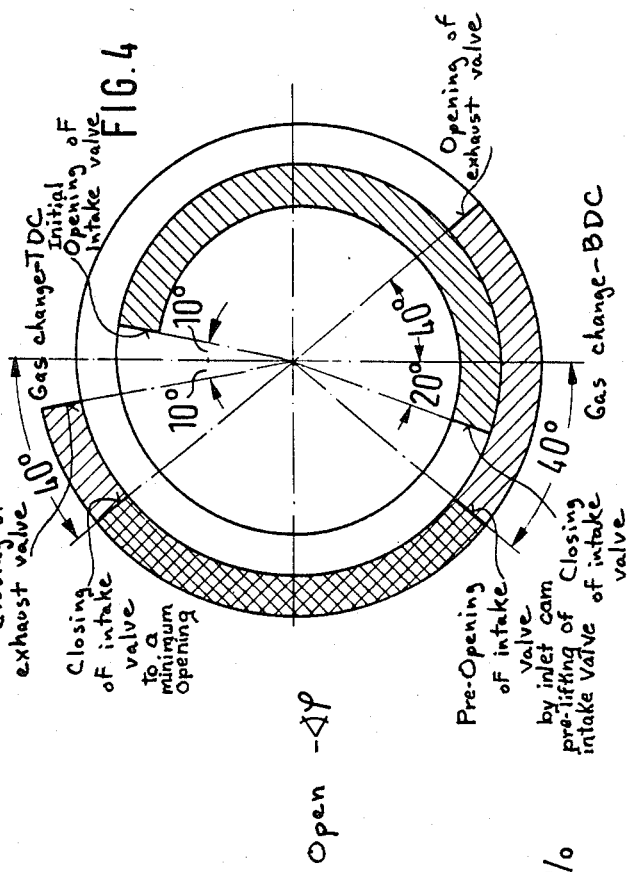
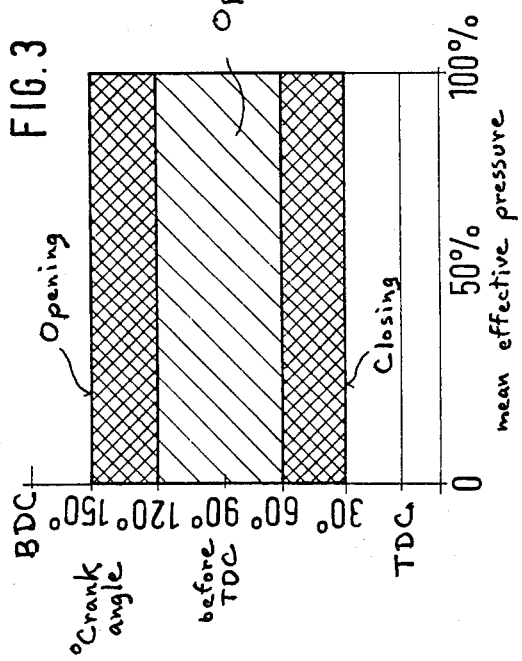

METHOD FOR IMPROVED INTERNAL EXHAUST GAS RECIRCULATION IN AN INTERNAL COMBUSTION ENGINE

BACKGROUND OF THE INVENTION

1. Field of the Invention

The present invention relates to an air-compressing, self-ignition or spark-ignition, four-stroke internal combustion engine having direct fuel injection, turbo-charging, and load-dependent internal exhaust gas recirculation. This exhaust gas recirculation is effected, at least in certain operating ranges, by intervention in the gas change system. Within this gas change system, the mixture formation is essentially controlled by means of the high-speed rotary motion of the fresh air charge, which is produced in an intake channel and is maintained in a combustion chamber having the shape of a solid of revolution.

2. Description of the Prior Art

Diesel engines have qualitative governing or control. There is no throttling and, consequently, volume flow is high. Owing to the difficulty of the task of achieving mixture formation immediately before combustion in a minimum of time, provision is made for more air to be drawn into the combustion chambers of the engine than is actually necessary for the combustion of the fuel injected into the combustion chambers. Generally, the greater the proportion of the inducted air, the lower the load of the engine. Moreover, combustion in the low load range is sluggish and takes place at a low temperature level. Therefore, this is the range where the exhaust gases are unfavorable with respect to the unburnt substances; above all, the great amount of oxygen is conducive to the formation of nitric oxides. This is particularly so in the case of direct-injection engines.

In recent years, it has become general practice, in turbo-charged internal combustion engines, to return a portion of the exhaust gases to the intake in order to reduce emission of pollutants (nitric oxides and hydrocarbons).

Exhaust gas recirculation reduces the oxygen content of the air for combustion and, consequently, the effective excess air in the fresh gases. In other words, the reaction kinetics of combustion are interfered with by means of the oxygen concentration of the cylinder charge, whereby the combustion process and the exhaust gas composition are influenced.

Another very important aspect of exhaust gas recirculation is the reduction of the ignition lag, which includes the time from the start of injection of the fuel to the start of combustion. Ignition lag is a consequence of the higher final compression temperature which results from the higher fresh gas inlet temperature. In addition to other advantages, e.g. the reduction of ignition noise, the shortening of the ignition lag results in an improvement in combustion which, in turn, decreases the emission of pollutants.

In an exhaust gas recirculation control system for diesel engines, it is desirable that the amount of air replaced by exhaust gas should be proportional to the amount of surplus air relative to actual air requirements for the combustion of the injected fuel, such that a maximum amount of surplus air is removed from the air flow supplying the engine cylinder without causing unsteady combustion of the fuel in the cylinders. The objective is to achieve maximum efficiency throughout the operating spectrum of the engine with respect to control of nitric oxide emission.

The maximum rate of exhaust gas recirculation is required in the lower part load range because this is where the greatest amount of excess air exists. In the full-load range, however, a high rate of exhaust gas circulation would reduce the output which the engine can attain because there is only a small amount of excess air. For this reason, it is necessary for the rate of exhaust gas recirculation to be controlled so that the proportion of recirculated exhaust gas decreases as the load of the engine increases until no exhaust gas at all is recirculated at full load.

A distinction is made between external and internal exhaust gas recirculation. In the case of external recirculation, the exhaust gases are returned from the exhaust gas ducts via pipes and control devices into the intake channel. In contrast to this, internal exhaust gas recirculation can be implemented in a simpler manner by appropriate intervention in the gas change system. Therefore, internal recirculation offers certain advantages over the external concept; especially, it affords advantages with respect to hydro-carbon emission in the low-load range (due to the hotter exhaust gas). Last but not least, it will also expedite cold starting and warming-up of the engine.

Intervention in the gas change system in the case of internal exhaust gas recirculation can be effected in various ways (cf. German Auslegeschrift No. 12 22 735 and German Pat. No. 12 42 044), the means employed including, inter alia, double-rise cams for controlling the gas change valves (cf. for instance, German Auslegeschrift No. 14 01 228, German Offenlegungsschrift No. 21 25 368, German Offenlegungsschrift No. 26 38 651, German Offenlegungsschrift No. 27 10 189, German Pat. No. 17 51 473).

Of the references mentioned, only the German Pat. No. 12 42 044 covers a turbo-charged internal combustion engine.

The present invention relates to this type of internal combustion engine, which uses internal exhaust gas recirculation in a similar manner to that already described.

An object of the present invention is to improve such an internal combustion engine of the aforementioned general type in such a way that, on the one hand, exhaust gas recirculation does not cause any weakening of the air swirl energy (charge swirl energy) at low loads, which would spoil the desired exhaust gas improvements, and that, on the other hand, assisted cylinder scavenging would be obtained at high loads.

BRIEF DESCRIPTION OF THE DRAWINGS

These and other objects and advantages will appear more clearly from the following specification in conjunction with the accompanying drawings, in which:

FIG. 2 is a view showing a valve lift diagram showing the opening function of the intake valve plotted against a full engine cycle;

FIG. 3 is a view showing a diagram determining intake valve opening angle during the exhaust stroke; and FIG. 4 is a view diagrammatically representing an example of a typical valve timing wherein the opening times of the valves are shown in connection with the crank shaft angle.

SUMMARY OF THE INVENTION

Figure 1:
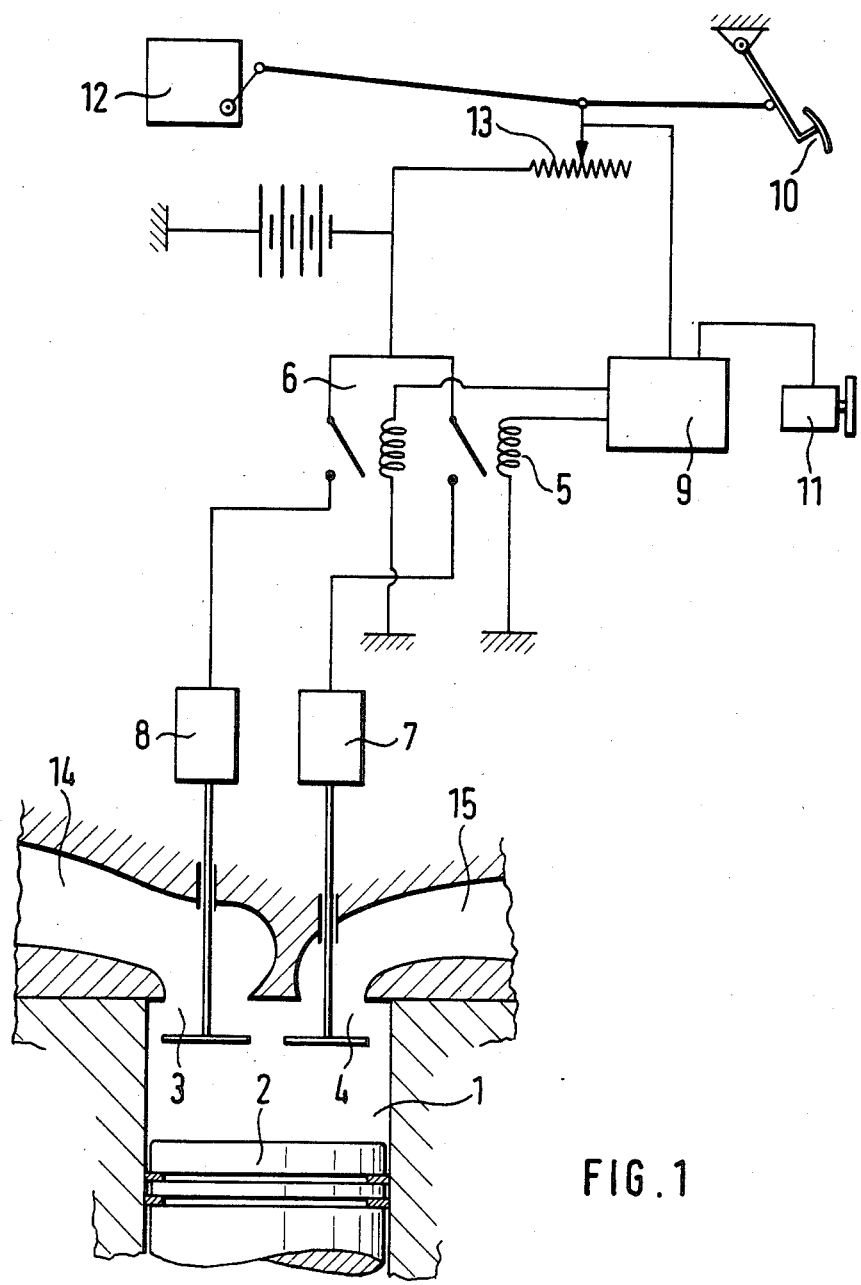
FIG. 1 is a view that shows a schematic partial section through the cylinder region, as well as the control system, for an internal combustion engine of a known type.

The invention is characterized primarily in that the inlet valve is briefly opened during the exhaust stroke, with the opening being timed not earlier than 30 degrees of crank angle after bottom dead center of the gas change cycle and with the highest lift being between 15 and 30% of the maximum inlet valve lift; and, in that, at the latest, when the exhaust valve closes (shortly before gas change bottom dead center position or BDC) only a minimum opening of the inlet valve exists, which is maintained until the start of the suction stroke (shortly after gas change top dead center position or TDC).

Due to the brief advance opening of the intake valve during the exhaust stroke, several improvements are accomplished in the direct-injection turbo-charged internal combustion engine such as is mentioned above. In the low-load range, advantageous internal exhaust gas recirculation is obtained which, in the upper load range, is automatically reduced and then removed due to the pressure conditions of charge air and exhaust gas. As a rule, the charging pressure up to about 30% of the engine load is lower than the cylinder pressure; at higher engine loads up to a full load, however, the charging pressure is higher. This means that, in these load ranges, air will then flow through the cylinder into the exhaust system. This provides assisted scavenging of the combustion chamber (during the exhaust stroke only) and additional cooling of the piston and the cylinder head. It is possible to do without scavenging at top dead center position, which is usual in turbo-charged engines in order to ensure adequate scavenging of the combustion space and, consequently, to construct the piston without valve recesses. The absence of valve recesses offers advantages in maintaining the rotary air motion in the combustion space and benefits in shaping the swirl channel. Without valve recesses, it is also possible to allow a higher thermal loading of the piston because there is no stress concentration effect due to the valve recesses. The exhaust gas which (at low load) is pushed back into the intake channels is drawn in again during the suction stroke. Since internal exhaust gas recirculation is effected by opening the intake valve during the exhaust stroke and not by re-opening the exhaust valve, which would also be possible during the suction stroke, there is no interference with, or reduction of, the air swirl energy. In other words, the gas mass which flows through the swirl channel of a direct-injection internal combustion engine and determines the air swirl energy in the cylinder (combustion chamber) is not decreased as the rate of exhaust gas recirculation is increased. Since no exhaust gas recirculation is desired at high engine loads, but only the scavenging of the combustion space, advance opening of the intake valve will start only at about 30 to 40 degrees of crank angle after gas change EDC when the cylinder pressure has already dropped to atmospheric pressure. In order to prevent too much exhaust gas being recirculated in the low load ranges (and, respectively, to prevent too much fresh air flowing through the cylinder in the higher load ranges), the highest lift of the intake valve during the exhaust stroke is limited to 15 to 30% of the maximum inlet valve lift. This lift is completed, at the latest, when the exhaust valve closes (shortly before gas change TDC), with the intake valve subsequently remaining open minimally until the start of the suction stroke, which is shortly after gas change TDC (not more than 1/10 of the maximum inlet valve lift). This affords advantages insofar as there are no interruptions in the gas mass flow.

Control of the intake valve during the exhaust stroke can be effected advantageously either fully electronically or a pre-lift nose which is known per se (on the inlet valve cam).

In a manner known per se, the air velocity of the rotating air for combustion—relative to the pitch diameter (0.7 times cylinder or piston diameter) and maximum inlet valve lift as well as 10 m/sec mean piston speed—has a tangential component of 30 to 50 m/sec.

BEST MODE FOR CARRYING OUT THE INVENTION

Referring now to the drawings in detail, FIG. 1 is a schematic representation of the cylinder area of an air-compressing, self-ignition or spark-ignition, four-stroke internal combustion engine having direct fuel injection and turbo-charging, the numeral 1 denoting the cylinder tube in which is situated the piston 2 (with the combustion chamber). The valves (intake valve 3 and exhaust valve 4) serve for the control of the engine and are actuated by variable valve control systems, which are electro-mechanical relay systems (5, 6 are the relays and 7, 8 are solenoids serving as final control elements). Engine characteristics for various operating modes in the form of the timings or control periods for the inlet valves 3 and exhaust valves 4, as well as fuel injection and ignition, are stored in a control unit 9. In response to a control input 10 (accelerator pedal), speed information 11 (speed signal transmitter) and additional parameters, such as engine component temperatures, cooling water temperature, combustion air temperature, etc., these engine characteristics are output and fed to the valve actuators, as well as to the injectors and ignition devices. The control unit 9 determines the duration of opening or open period of the valves 3, 4 in degrees of crank angle as a function of the engine load which, as already mentioned, is determined by the driver actuating the accelerator pedal 10, which controls the quantity of injection of the injection pump 12 and transmits a signal to the control unit 9 via the converter 13. A speed-dependent correction is transmitted, as already mentioned, by the speed signal transmitter 11 to the control unit 9 as a function of the engine speed.

According to the invention, the intake valve 3 is briefly opened during the open period of the exhaust valve 4 (i.e. during the exhaust stroke) dependent on the engine load. The smaller the engine load, the longer the open period of the intake valve 3 during the exhaust phase. As a result, the following is achieved:

1. At low load:

An amount of exhaust gas, which is dependent on the engine load, is displaced into the intake channel 14 during the exhaust phase (the exhaust gas back-pressure being higher than the charge air pressure). This amount of exhaust gas is drawn in again during the subsequent intake phase. The charge in the cylinder then consists of a mixture of air and exhaust gas and now contains only the amount of oxygen actually required at this engine load. Since the total volume flow through the inlet or intake channel during the intake phase is maintained, there is no weakening of the necessary high swirl energy which is required in direct-injection engines for mixture formation. As a result of the lower volume flow through the exhaust port 15 at lower engine load (during the exhaust phase), the gas change work is smaller, since the pressure losses in the exhaust system are less. The amount of fresh air required is correspondingly smaller and, consequently, the load of the air cleaner is less. Since the charge in the cylinder at the end of the intake stroke at low load consists of fresh air and exhaust gas, the effect of hot exhaust gas recirculation is obtained. As a result, exhaust gas emissions at low load are reduced for three reasons:

(a) The concentration of some pollutants in the combustion space, which is partially filled with hot exhaust gas, is less. Nitric oxides, in particular, are suppressed during combustion because the oxygen content of the charge is less. Due to the hotter charge in the cold engine and at low load, concentrations of unburnt matter (hydrocarbons) are also less.

(b) Emissions by volume are less because the exhaust gas is partly retained in the engine.

(c) The ignition lag is less.

2. At higher load (upwards of about 40% of the rated load):

Due to the converse pressure conditions (the charge air pressure is now higher than the exhaust gas pressure), there is no backflow of the exhaust gases into the intake channel; instead fresh air is drawn into the cylinder. As a result, there is intensive scavenging of the cylinder already during the exhaust stroke. This permits elimination of the usual scavenging of the cylinder during the valve overlap (at gas change TDC), which has a drawback in that valve recesses are required in the piston. This is particularly advantageous for direct-injection engines because the valve recesses hinder the maintenance of the air swirl energy until ignition at the top dead center position (TDC).

In order to prevent exhaust gas being recirculated at higher loads as a result of the high cylinder pressure, advance opening of the intake valve 3 starts only at about 30 to 40 degrees of crank angle after gas change BDC (bottom dead center position), because at this stage the cylinder pressure will have dropped to atmospheric pressure.

The highest lift of the intake valve 3 during the exhaust stroke is limited to 15 to 30% of the maximum inlet valve lift. On the one hand, this prevents excessive exhaust gas recirculation (in the low load ranges) and, on the other hand, eliminates excessive scavenging (in the higher load ranges). The advance opening of the intake valve 3 is terminated, at the latest, when the exhaust valve closes (shortly before gas change TDC); the intake valve 3 subsequently remains minimally opened until the start of the suction stroke (shortly after gas change TDC), a maximum of 1/10 of the maximum inlet valve lift. As a result, there are no interruptions of the flow.

FIG. 2 plots the lift function of the intake valve 3 versus a complete engine cycle (referred to as a given engine load and speed). Double opening of the inlet valve can be effected either fully electronically, (see FIG. 1) or can be implemented in a simpler manner by providing an additional nose (pre-lift nose) on the inlet cam. The open period, or more aptly, the open angle (in phase and duration) is denoted by the symbol $\rho$. It can also be seen that the open angle is calculated only after 1 mm of valve lift.

FIG. 3 deals, in somewhat greater detail, with the determination of the inlet valve open angle in the case of supercharged engines. In this graph, the mean effective pressure of the engine in percentage (on the abscissa) is plotted versus the crank angle (on the ordinate). In both the upper and lower range of the graph there is a cross-hatched band; the upper band relates to the open range and the lower band relates to the closed range of the inlet valve. These bands indicate the differences which are intended for optimization of various turbo-charger selections or engine speeds. In the example illustrated, the open angle extends maximally from 150° of crank angle before TDC to 30° of crank angle before TDC, and minimally from 120° of crank angle before TDC to 60° of crank angle before TDC. The cross-hatched band from 150° of crank angle before TDC to 120° of crank angle before TDC relates to the open range, while the cross-hatched band from 60° of crank angle before TDC to 30° of crank angle before TDC relates to the closed range of the inlet valve 3.

An example of a typical valve timing (for an engine with a nominal speed of 3000 rpm) is given in FIG. 4, from which can be seen the open periods (here again the timings are given at 1 mm of valve lift) of the intake valve (3) and the exhaust valve (4) vs. the crank angle position. During the exhaust phase, the intake valve starts to open 40° of crank angle after gas change BDC or, to put it differently, 140° of crank angle before gas change TDC. The opening time of the exhaust valve is 40° of crank angle before gas change BDC, and the closing time is at 10° of crank angle before gas change TDC. The intake valve closes already again at 40° of crank angle before gas change TDC. Consequently, there is an overlap of 100° of crank angle of the open period of the inlet valve with the open period of the exhaust valve (210° of crank angle). During the intake stroke, the intake valve opens normally at about 10° of crank angle agter gas change TDC; the closing time is at 20° of crank angle after gas change BDC (total open period of the intake valve being 190° of crank angle). The exhaust valve remains closed throughout this period.

In the case of engines where hydraulic or pneumatic power is available, control of the opening motions of the valves 3 and 4 is by means of suitable electrically actuated valves or hydraulic or pneumatic final control elements.

Finally, it may be mentioned that it may be useful in the case of the present invention, in particular during cold starting and during the warming-up phase, to provide an additional adjustable valve installed in the exhaust system and/or an additional adjustable valve installed in the induction system in order to increase the amount of exhaust gas supplied (thereby increasing the exhaust back-pressure). Such throttling action in the exhaust/or induction system, as a byproduct, will provide the conventional pressure wave effect by which exhaust gas recirculation and/or scavenging can be intensified.

The present invention is, of course, in no way restricted to the specific disclosure of the specification and drawing, but also encompasses any modifications within the scope of the appended claims.

What I claim is:

1. In an air-compressing, self-ignition respectively spark-ignition, four-stroke internal combustion engine, having fuel injection, turbo-charging, and load-dependent internal exhaust gas recirculation which is effected, at least in certain operating ranges, by intervention in the gas change system wherein the mixture formation is essentially controlled by the high speed rotary motion of a fresh charge which is produced in an intake channel and maintained in a combustion chamber in the shape of a solid of revolution, a method of improving the internal exhaust gas recirculation, which comprises the steps of:

opening an intake valve shortly after gas change-top dead center position;

closing said intake valve;

proceeding with compression-stroke cycle and working-operating stroke cycle accompanied by valve closing;

opening an exhaust valve;

pre-opening said intake valve no earlier than 30° of crank angle after gas change-bottom dead center position briefly during an exhaust stroke, with the amount of re-opening being between 15 and 30% of the maximum possible opening of said intake valve;

closing said exhaust valve shortly before gas change-top dead center position;

at the latest, when said exhaust valve is closed, closing said intake valve to a minimum opening; and maintaining said minimum opening until repeating said initial step of opening said intake valve shortly after gas change top dead center.

2. A method according to claim 1, that includes steps of providing an average axial piston speed of 10 m/sec, and with said intake valve fully opened, providing the air velocity of the rotating combustion air in a cylinder with a tangential component of 30 to 50 m/sec relative to the pitch diameter which is 0.7 times the cylinder or piston diameter.

3. A method according to claim 1 wherein until beginning of intake stroke said minimum valve opening is not more than 1/10 of the maximum inlet valve lift.

4. A method according to claim 3, that includes a step of controlling the re-opening of said intake valve by electronic means.

5. A method according to claim 3, that includes a step of controlling said pre-opening of said intake valve by inlet cam pre-lifting thereof.

* * * * *